No. 665,070. Patented Jan. 1, 1901.
F. A. DELANO.
LOCOMOTIVE.
(Application filed June 4, 1900.)
(No Model.) 4 Sheets—Sheet 2.

No. 665,070. Patented Jan. 1, 1901.
F. A. DELANO.
LOCOMOTIVE.
(Application filed June 4, 1900.)

(No Model.) 4 Sheets—Sheet 4.

UNITED STATES PATENT OFFICE.

FREDERIC A. DELANO, OF CHICAGO, ILLINOIS.

LOCOMOTIVE.

SPECIFICATION forming part of Letters Patent No. 665,070, dated January 1, 1901.

Application filed June 4, 1900. Serial No. 18,998. (No model.)

*To all whom it may concern:*

Be it known that I, FREDERIC A. DELANO, a citizen of the United States, residing at Chicago, in the county of Cook and State of Illinois, have invented certain new and useful Improvements in Locomotives, of which the following is a specification.

The principal object of the invention is to provide a simple, economical, and efficient locomotive.

A further object is to provide a locomotive having a wide and deep fire-box, with a frame and other parts to support and hold the same in an efficient and practical manner.

A further object of the invention is to provide a locomotive having a wide and deep fire-box and a trailing or rear supporting truck and wheels, with journals outside of such wheels, so as to diminish as far as possible the rolling motion of the engine and place the journal-boxes where they are removed from the objectionable proximity to the ash-pan and conveniently cared for.

Further objects will appear from an examination of the drawings and the following description and claims.

The invention consists principally in a locomotive in which there are combined a relatively wide and deep fire-box with inside frames back to the fire-box, and wider outside frames beginning back of the rear drivers and extending back under the mud-ring of the fire-box.

The invention consists, further, in a locomotive in which there are combined the ordinary driving-wheels, a frame providing journal-boxes for and inside the same back to the fire-box and wider outside frames beginning back of the rear drivers and extending back under the fire-box.

It consists, further, in a locomotive in which there are combined the ordinary driving-wheels, a frame providing journal-boxes for and inside the same back to the fire-box, trailing or supporting wheels, and outside frames beginning back of the rear drivers and providing outside journal-boxes for the trailing wheels; and it consists, further and finally, in the features, combinations, and details of construction hereinafter described and claimed.

Figure 1:
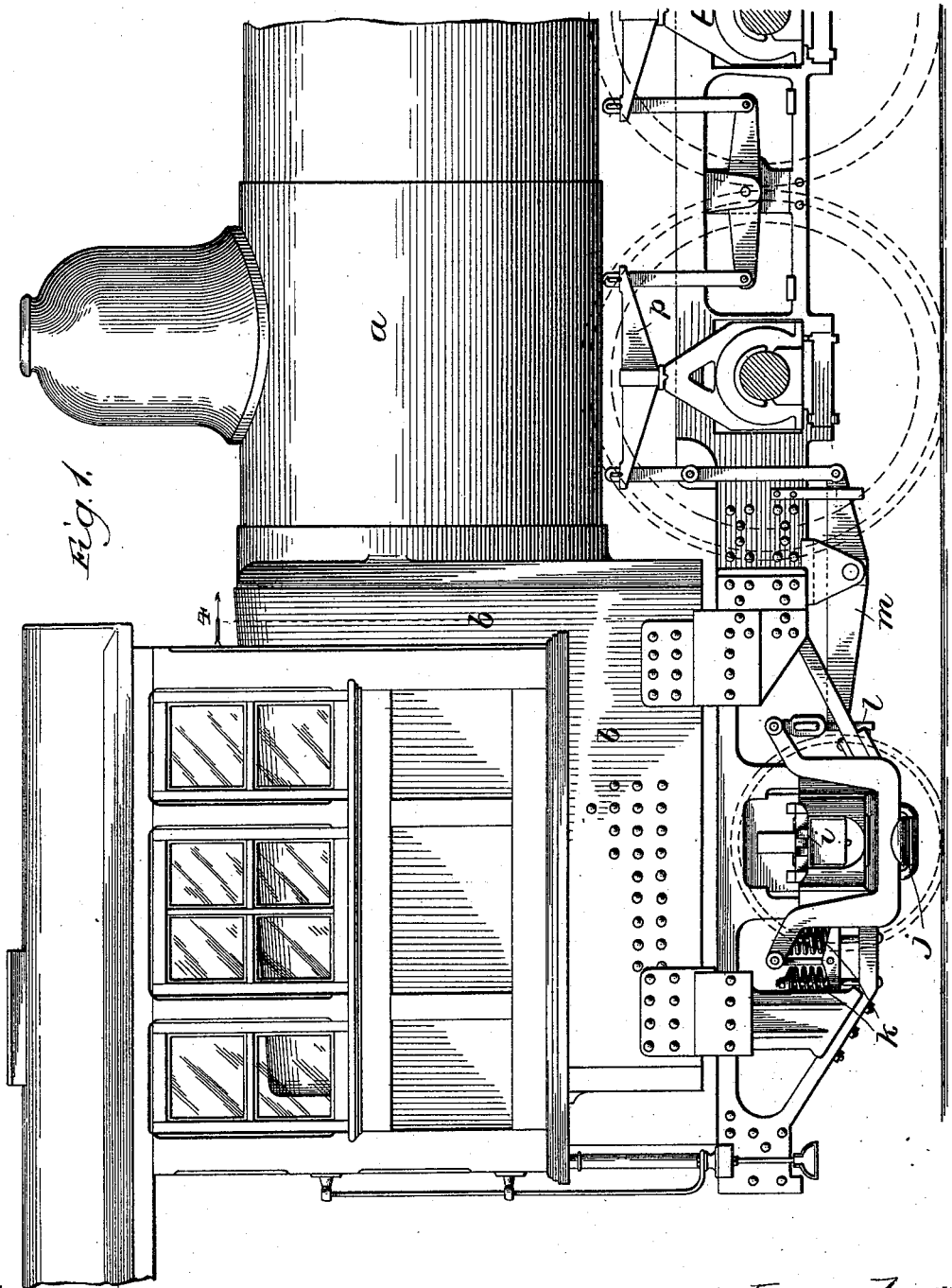
Figure 2:
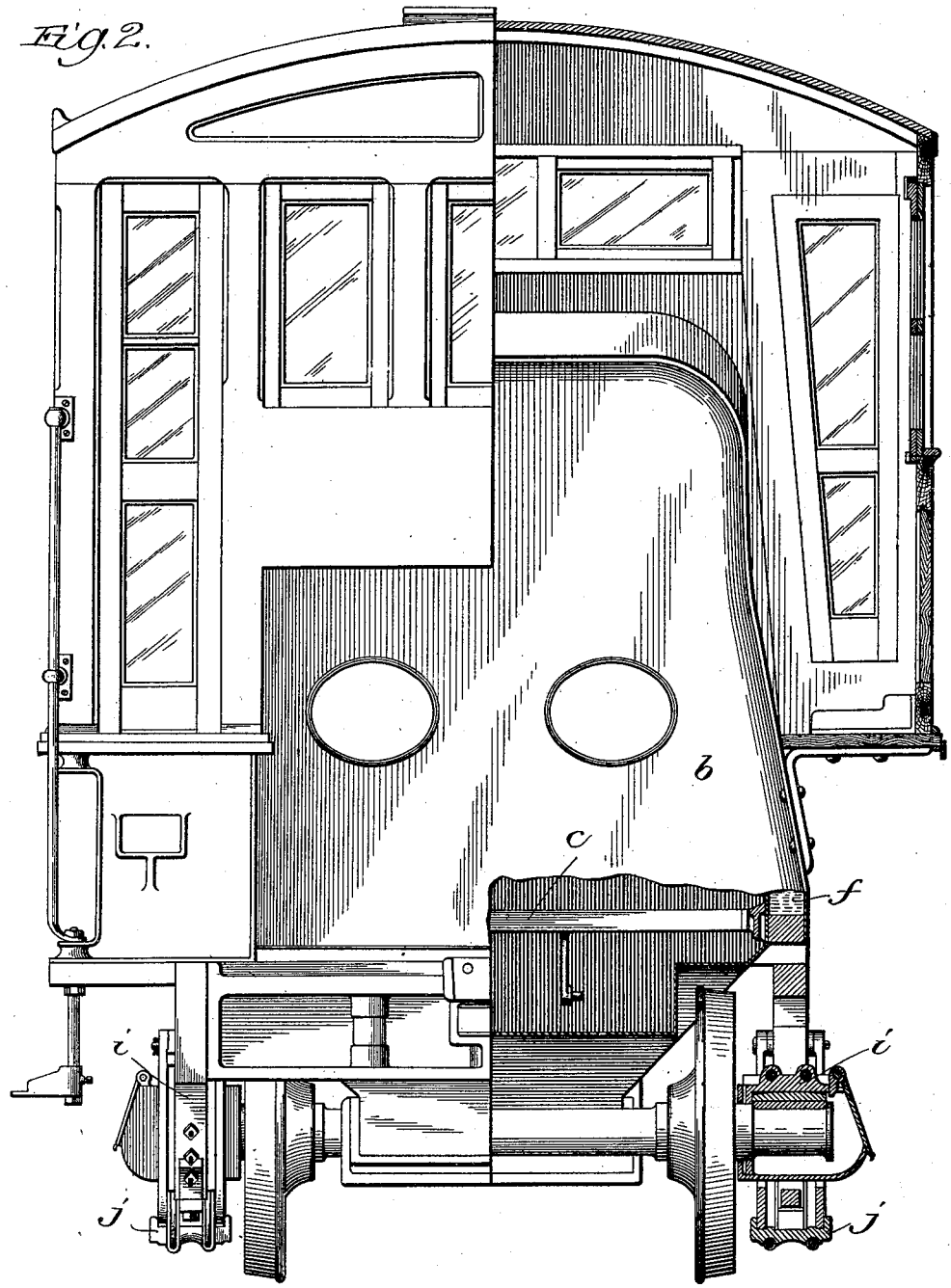
Figure 3:
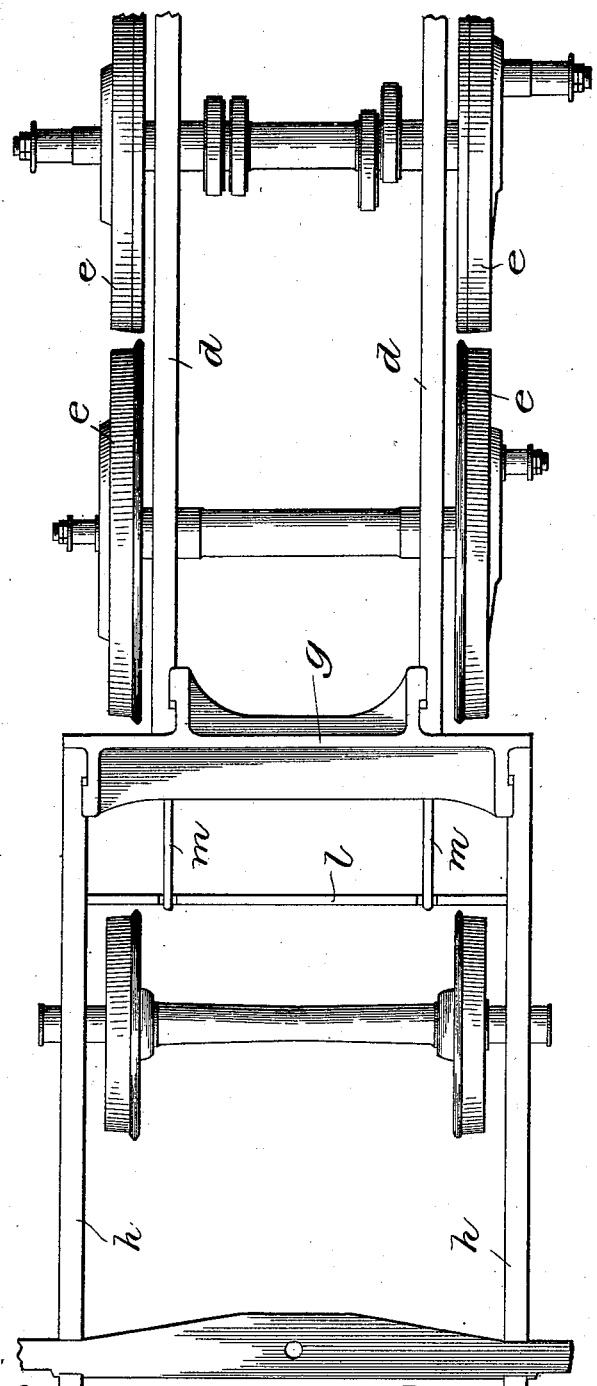
Figure 4:
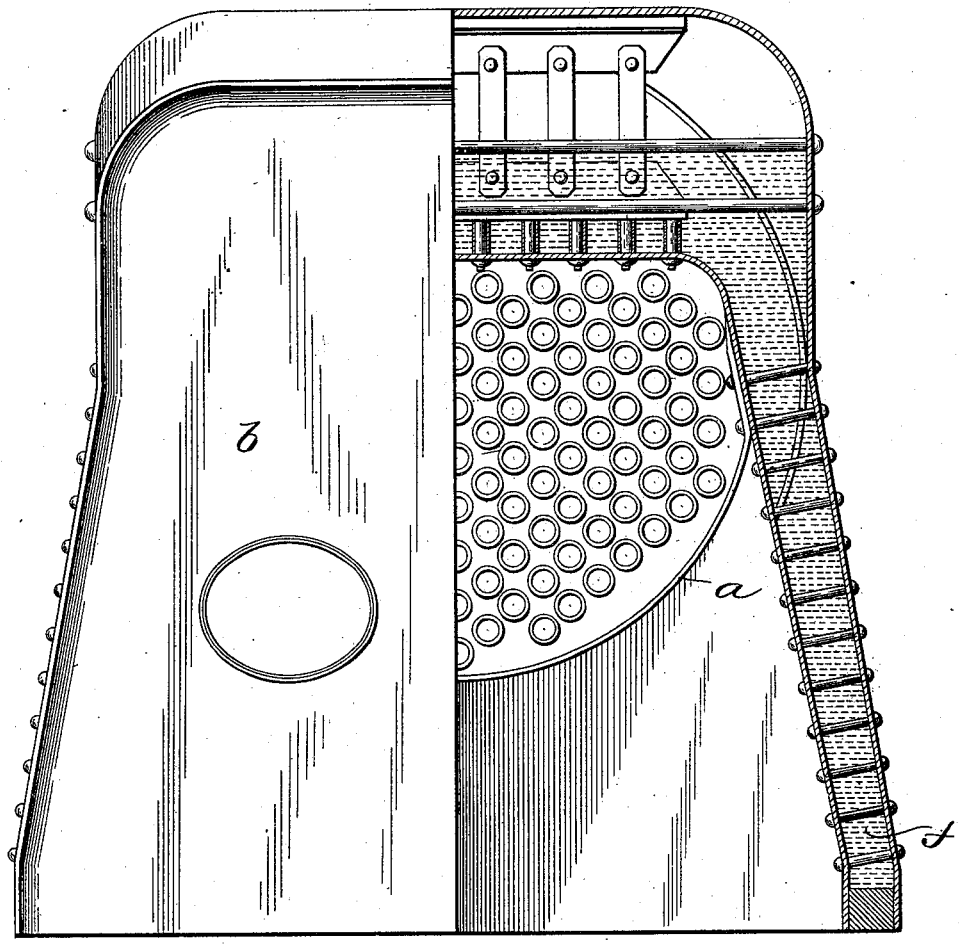

In the accompanying drawings, Figure 1 is a side elevation of a portion of a locomotive, partly in section, constructed in accordance with my improvements; Fig. 2, an end view, partly in section, looking at the locomotive from the rear; Fig. 3, a skeleton plan view of the frame and supporting driving-wheels, and Fig. 4 a cross-sectional view through the fire-box on line 4 of Fig. 1.

In the art to which this invention relates it is well known that heretofore it has been customary to build the frame for all standard-gage engines inside of the driving-wheels, making what is known as the "straight-bar" frame from one end of the engine to the other. This type of engine necessitated originally a construction of fire-box in which it was squeezed in between the frame, making a frame about two feet (2') and eight inches (8") wide. Necessity, however, demanded a change in the shape of a larger fire-box, so that the fire-box of later constructions has been placed above the frames, which required it to be made somewhat shallower, but enabled a maximum width of fire-box of three feet and four inches to be made. Even this width of fire-box with a grate ten feet long limited the grate area to thirty-three square feet, and even with this increased grate area objections still remained in the use of such engines in that the stoker or fireman had to stoke over a comparatively great length of grate in order to obtain the best results. To get any sufficient depth of fire-box required with this construction necessitated setting the shell of the boiler very high, thus giving the engine less stability. Another objection to the type of engines which have been made heretofore is that in the construction of the frames the bearings for the rear as well as all of the other axles were made inside of the wheels, so that the engines "lurched" or "rolled" considerably, and the driving or oil boxes for the trailing wheel were under the ash-pan, which transmitted a great amount of heat to these bearings, which as a consequence were liable to become overheated. The principal objects of my invention, therefore, is to provide a simple, economical, and efficient engine which will give a greater width of fire-box, enabling a larger grate-surface to be obtained, to place the journals for the rear wheels or trucks outside of the wheels in such a manner as to minimize the objectionable rolling or lurching action of the locomotive, all of which will more fully herein appear.

In illustrating and describing my invention I will only illustrate and describe such parts or portions which I consider to be new, taken in connection with so much that is old as will properly disclose the invention and enable those skilled in the art to make or practice the same, leaving out of consideration other and well-known elements, which if illustrated and described herein would only tend to confusion, prolixity, and ambiguity.

In constructing a locomotive in accordance with my improvements I prefer to make a boiler $a$ of the desired size, shape, and strength to meet the conditions which are ordinarily incident to the use of the same. This boiler extends from the front end thereof back to the rear, where it joins with the fire-box portion $b$, which widens out considerably from that of the boiler proper, as shown particularly in Figs. 1 and 2. The fire-box is dropped down, as shown particularly in Fig. 2, and widened out at or near the lower portion, so as to give as wide a grate-surface $c$ as may be needed and as wide as six feet—for standard-gage track four feet eight and one-half inches, where heretofore the maximum width has been but three feet and four inches.

To support the parts in proper position, I make a frame composed of two parts, a narrow straight-bar frame $d$, which extends inside of the driving-wheels $e\ e\ e\ e$ back to about the fire-box and furnishes the journal-boxes for the axles thereof inside of the wheels. At and below the fire-box, preferably adjacent to and below the mud-ring $f$, the frame is widened out by providing it with a rigid cross-frame $g$, arranged transversely thereof, so as to connect the bars of the narrow front frame together at the rear portion thereof and the rear frame $h$, which is considerably (about twenty-seven inches) wider, at the front end thereof, so that the entire frame when considered as a whole has a frame portion inside of the ordinary driving-wheels back to the fire-box and outside frames outside of the rear trailing wheel or truck and practically under the mud-ring thereof. An inspection of the drawings will show that an unusually-wide fire-box is thereby obtained and one that is considerably deeper than possible, unless the entire boiler be raised very much higher, when the maximum width of fire-boxes heretofore used is considered. As shown in the drawings, the oil and journal boxes for the rear or trailing wheels are outside of the wheels, so that the journals for such wheels are placed at a point as remote as possible from the fire-box. By this construction three distinct advantages are obtained—first, a wide and yet deep fire-box; second, the danger of overheating rear journals by the conduction of heat from the ash or fire box is minimized, and, third, the tendency of the locomotive to roll or lurch is also minimized.

Heretofore in engines the equalization of weight between the back trailing truck and drivers has been obtained in an independent manner—that is, the equalization was provided by mechanisms independent of each other. In order, however, to obtain greater stability in the engine and diminish the rolling or lurching thereof, I have provided equalizing mechanism which makes the equalization of both sides of the engine dependent one on the other. In order to accomplish this result, I provide a back equalizing-bar and pass it around the journal-boxes $i$ and supported on sling-carrying saddles $j$. This back equalizing-bar is preferably provided with a yielding connection at the rear portion, where it is attached to the frame by means of coil-springs $k$, (see Fig. 1,) though this can be dispensed with and a rigid connection made. The front end of this back equalizing-bar is connected across the engine by means of a long transverse equalizing-bar $l$, which for convenience is bent down in the center and on which a longitudinal equalizer $m$ rests. This longitudinal equalizer is fulcrumed under the cross-frame substantially on a line with the front portion thereof and is suspended by a spring-hanger of the usual form, as shown in Fig. 1, to the back end of the rear driving-spring $p$, furnishing in this manner the usual longitudinal equalization and at the same time a cross equalization.

I claim—

1. A locomotive provided with a relatively wide and deep fire-box, having inside frames back to the fire-box, and wider outside frames beginning back of the rear drivers and extending back under the fire-box, substantially as described.

2. A locomotive provided with a relatively wide fire-box and ordinary driving-wheels, a frame providing journal-boxes for and inside the same back to the fire-box, and relatively wider outside frames beginning back of the rear drivers and extending back under the fire-box, substantially as described.

3. A locomotive provided with ordinary driving-wheels, a frame providing journal-boxes for and inside the same back to the fire-box, trailing supporting wheels or truck, an outside frame beginning back of the rear drivers and providing journals for the trailing wheels outside of the same, substantially as described.

4. In a locomotive, the combination of ordinary driving-wheels, a frame inside the same extending back to the fire-box, a relatively wide fire-box, and outside frame back and under the same, trailing wheels arranged inside the rear outside frame, a back equalizing-bar connected at the rear portion thereof to the rear frame and having its front end connected across the engine to the opposite bar by a transverse equalizer on which the longitudinal equalizers rest, substantially as described.

5. A locomotive provided with the ordinary driving-wheels, inside frames extending back to the fire-box and providing journals for the driving-wheels inside the same, trailing supporting wheels or truck, and outside frames rigidly secured to the inside frames and providing journals for the trailing wheels or truck outside of the wheels thereof, substantially as described.

6. A locomotive provided with a relatively wide and deep fire-box, and having supporting inside frames back to the fire-box, and wider outside supporting-frames beginning back of the rear drivers and extending back under the fire-box, substantially as described.

7. A locomotive provided with a relatively wide fire-box and ordinary driving-wheels, a frame providing journal-boxes for and inside the same back to the fire-box, and relatively wider outside supporting-frames beginning back of the rear drivers and extending back under the fire-box, substantially as described.

8. A locomotive provided with a relatively wide fire-box, and having a frame the forward portion of which back to the fire-box is inside the planes of the drivers, and the rear portion of which beginning back of the rear drivers extends back under the fire-box outside the planes of the drivers, substantially as described.

9. A rigid locomotive-frame provided with a forward portion back to the fire-box adapted to lie inside of the planes of the drivers, and a rear portion beginning back of the rear drivers and adapted to lie outside of the planes of the drivers, substantially as described.

FREDERIC A. DELANO.

Witnesses:
THOMAS F. SHERIDAN,
HARRY IRWIN CROMER.